United States Patent Office.

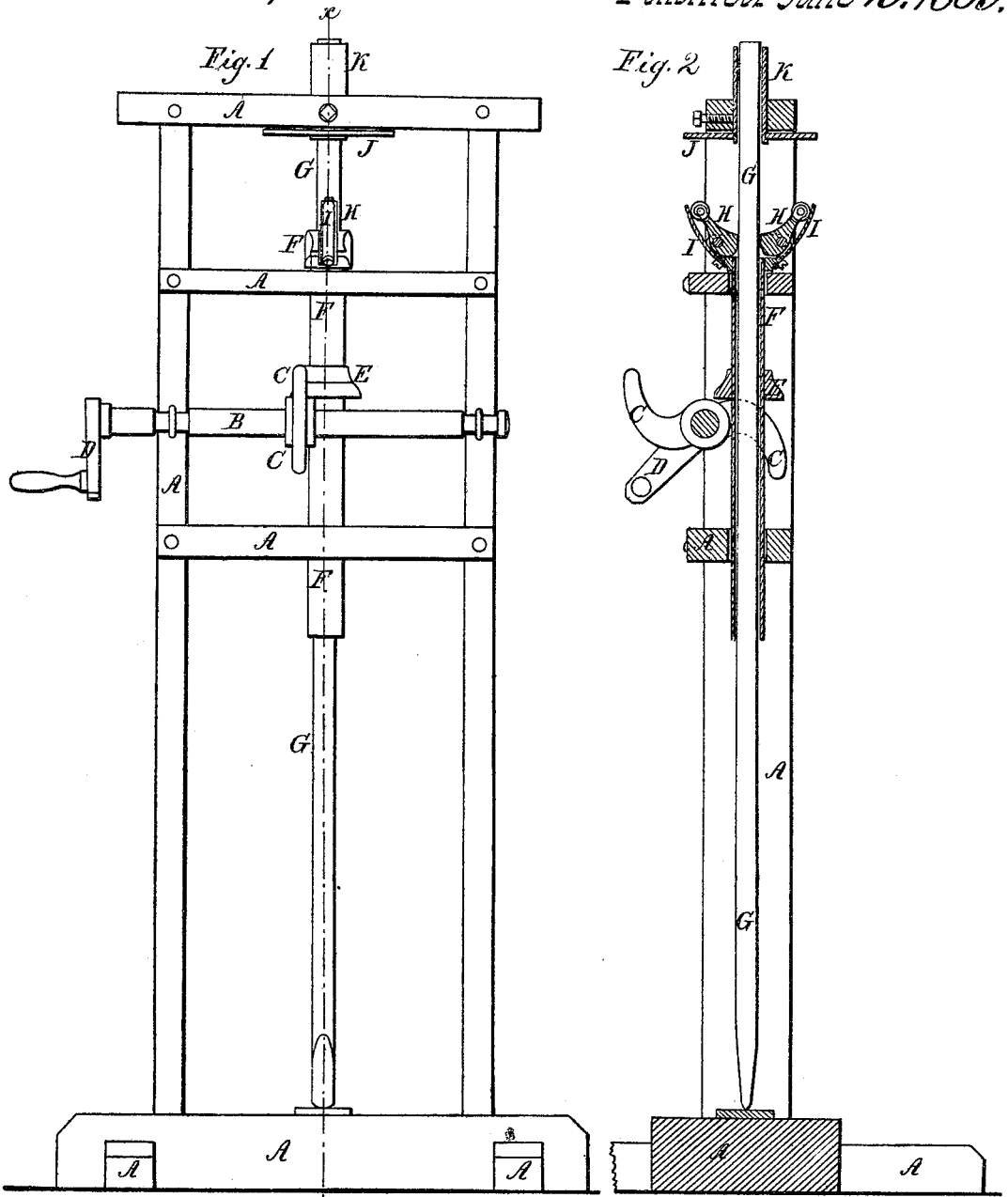

SAMUEL LEWIS, OF WILLIAMSBURG, NEW YORK.

Letters Patent No. 91,352, dated June 15, 1869.

IMPROVED ROCK-DRILL.

The Schedule referred to in these Letters Patent and making part of the same.

*To all whom it may concern:*

Be it known that I, SAMUEL LEWIS, of Williamsburg, in the county of Kings, and State of New York, have invented a new and improved Self-Feeding and Self-Rotating Drill; and I do hereby declare that the following is a full, clear, and exact description thereof, which will enable those skilled in the art to make and use the same, reference being had to the accompanying drawings, forming part of this specification, in which—

Figure 1 is a vertical front view of the drill in position, with the appliances for raising, rotating, and feeding the same.

Figure 2 is a vertical cross-section of the same, taken through the line $x\,x$, fig. 1.

Similar letters of reference indicate corresponding parts.

The various methods of lifting and feeding drills and operating stamp-mills heretofore used, have been attended with a degree of complication, which rendered the mechanism liable to derangement, and occasioned a serious waste of power through the resulting friction.

Desiring to simplify the construction and operation of machinery of this kind, intended to be driven by steam-power, I have dispensed with a number of parts heretofore employed, and by improvements in general construction, materially reduced the amount of friction inseparable from former methods.

This invention has for its especial object the lifting, rotating, and freeing of the drill, by as nearly one motion and device as is practicable, but which, having in view the large variety of work in the quarry, under water, for coal-oil wells, stamp-mill movements, &c., shall be applicable to a wider range of uses, by a simpler series of means than anything heretofore produced for such purposes; and It consists in the construction and combination of parts by means of which the drill is raised, rotated, and freed, as hereinafter more fully described.

A is the frame in which the operating-mechanism is set, the said frame being adopted as a mere temporary means of combining the various attachments for the purposes of this application, since the drill in practice, being intended for operation in a numerous series on a common shaft, especially where sub-aqueous drilling is to be done, would require a more extended system of attachments.

B is the shaft upon which the cam C, or any desired number of cams is placed, it being intended to operate the drills in parallel rows of from five to ten each, up to fifty or one hundred.

D is the crank by which the shaft B is operated, and which, when the machine is to be driven by power, is replaced with a pulley.

E is a collar formed upon or securely attached to the tube F, which slides up and down, and rotates freely in bearings in the frame A, and through which the drill G passes.

As the cam C rises and presses against the collar E, the collar E and tube F are raised, and at the same time rotated, carrying the drill G with them.

In the upper end of the tube F, or in supports attached to said upper end, are pivoted the eccentrics H, upon opposite sides of the said drill G, as shown in figs. 1 and 2.

In the drawings the eccentrics H are represented as being held forward against the drill G, by the springs I, but in large machines the springs I are not necessary, as the weight of the lower parts of the said eccentrics will be sufficient to hold them forward against the drill, with sufficient force to raise the drill as the tube F is raised by the operation of the cam C, the weight of the drill, as soon as it begins to rise, tending to cause the said eccentrics H to take a firmer hold upon it.

The drill G is thus raised to a height nearly equal to the radius of the circle described by the outer end of the cam.

As the cam C approaches a perpendicular position, the outer ends of the eccentrics H come in contact with the disk J, which revolves upon the lower end of the guide-tube, or bearing K, through which the upper part of the drill G passes, and as the tube F and drill G continue to rise, the said outer ends of the said eccentrics H are spread apart, releasing the drill G, and allowing it to fall freely.

As the cam C, in its revolution, passes beyond the periphery of the collar E, the tube F and all its attachments drop back to their lower or original positions, ready to be again operated by the cam, to raise the drill for another stroke, and so on till the drilling has been done to the desired depth, the only limit to the depth of the drill-hole being the length of the drill G above the disk J, at starting.

The drill is thus raised, rotated, and fed without any alteration or attention whatever from the commencement to the completion of any single drilling, thereby avoiding a considerable complication of machinery, and the expense incident to personal attention and a frequent readjustment of parts.

I claim as new, and desire to secure by Letters Patent—

1. The combination of the eccentrics H H, drill G, sliding rotating tube F, collar E, cam C, and disk J, as and for the purpose specified.

2. The revolving disk J, in combination with the eccentrics H, attached to the sliding and rotating tube F, substantially as herein shown and described, and for the purpose set forth.

The above specification of my invention signed by me, this 2d day of November, 1868.

SAMUEL LEWIS.

Witnesses:
E. GREENE COLLINS,
JAMES T. GRAHAM.